United States Patent
Barker

(10) Patent No.: US 6,226,225 B1
(45) Date of Patent: May 1, 2001

(54) EXPANDABLE MARINE DIVERTER

(75) Inventor: Glen P. Barker, Friendswood, TX (US)

(73) Assignee: Western Geco, Houston, TX (US)

( * ) Notice: Subject to any disclaimer, the term of this patent is extended or adjusted under 35 U.S.C. 154(b) by 0 days.

(21) Appl. No.: 09/304,507

(22) Filed: May 3, 1999

(51) Int. Cl.[7] .................................................. G01V 1/00
(52) U.S. Cl. ................................................ 367/17; 114/244
(58) Field of Search ........................ 367/17, 16; 175/97; 114/244, 245

(56) References Cited

U.S. PATENT DOCUMENTS

| | | | |
|---|---|---|---|
| 2,981,220 | * | 4/1961 | Fehlner .................................. 367/17 |
| 4,033,278 | * | 7/1977 | Waters ................................... 114/245 |
| 4,729,333 | * | 3/1988 | Kirby et al. ........................... 114/244 |
| 5,357,892 | * | 10/1994 | Vatne et al. ............................ 114/244 |
| 6,011,752 | * | 1/2000 | Ambs et al. ............................. 367/17 |

* cited by examiner

*Primary Examiner*—Jay Patidar
*Assistant Examiner*—Victor J. Taylor
(74) *Attorney, Agent, or Firm*—Alan J. Atkinson

(57) ABSTRACT

An expandible diverter for use in marine seismic operations. The diverter is stored in a retracted position for transport and handling, and is expandible to increase the amount of surface area in contact with the water. The diverter can be formed with two or more moving components, and can comprise an expandible body. A controller can increase or decrease the amount of surface area in contact with the water to meet different conditions, and can control movement of the diverter as seismic vessel tows the diverter through the water.

20 Claims, 3 Drawing Sheets

EXPANDABLE MARINE DIVERTER

BACKGROUND OF THE INVENTION

The present invention relates to the field of diverters used in marine seismic operations. More particularly, the invention relates to an expandable diverter useful in marine seismic operations which can be expanded or retracted to adjust the storage volume and performance characteristics of the diverter.

Marine seismic diverters control movement of seismic streamers and other equipment relative to a seismic tow vessel. As the tow vessel moves through the water, one or more streamers or other equipment carrying cables are towed at a known velocity through the water. For a single cable, a diverter can control movement of the cable tail end in cross currents and in tow vessel turns. For multiple cables, diverters pull the cables outwardly from the vessel centerline to establish and to maintain selected cross-line cable spacing and placement in a seismic array. Diverters are also used to control the elevation of the diverter and other seismic equipment in the water.

Marine seismic diverters typically have fins or wings for urging the diverter and attached cable away from the seismic array centerline, or to control the diverter elevation. The displacement forces exerted by the diverters depend on the tow vessel speed, the diverter shape, and the diverter surface area in contact with the water.

The diverters are typically stored on board a seismic vessel for transport to the survey site. Diverters are bulky and require significant storage space during such transport. Diverters can be stored in pieces or sections for assembly at the survey site, however such systems are time consuming and are not adjustable when the diverter is positioned in the water. When the survey site is reached, the diverters and other seismic equipment are removed from the storage areas and are deployed into the water. U.S. Pat. No. 4,313,392 to Guenther et al. (1982) disclosed a system for deploying and retrieving seismic source assemblies.

Various deflecters such as paravanes and other devices have been developed for marine seismic operations. U.S. Pat. No. 3,611,975 to Ashbrook (1971) disclosed a paravane having wing members for controlling the paravane elevation. U.S. Pat. No. 3,774,570 to Pearson (1973) disclosed a paravane having pivoting diving planes for controlling the paravane elevation. U.S. Pat. No. 4,033,278 to Waters (1977) disclosed cable paravanes having adjustable hydrofoil and stabilizer elements. U.S. Pat. No. 4,323,989 to Huckabee et al. (1982) disclosed steering devices for maintaining a float in a desired lateral position. U.S. Pat. No. 4,484,534 to Thillaye du Boullay (1984) disclosed a profiled wing having profiled caissons at the lateral end, together with a central rib. U.S. Pat. No. 4,676,183 to Conboy (1987) disclosed a submersible positioning device having stabilizers for controlling movement of the device.

Other diverter systems have been developed. U.S. Pat. No. 4,719,987 to George et al. (1988) disclosed a bipolar paravane having left and right wings for providing a side force in the water. U.S. Pat. No. 4,890,568 to Dolengowski (1990) disclosed a tail buoy controllable with rudders. U.S. Pat. No. 5,357,892 to Vatne et al. (1994) disclosed a diverter having a lever for adjusting the streamer attachment point. U.S. Pat. No. 5,532,975 to Elholm (1996) disclosed a positioning device having wings and rudders for controlling movement of the device through water.

Conventional diverters use wings, moving planes, and rudders to control movement of the diverters through water. The effectiveness of such mechanical controls depends on numerous factors including the wing size, tow speed, and other considerations. The size of conventional diverters increases as the width and length of seismic arrays increases, thereby requiring more transport space and handling requirements. Significant cargo space is required for diverter handling, therfore adding to the overall vessel size requirements. Accordingly, a need exists for an improved diverter which is easy to handle and provides enhanced diversion capabilities.

SUMMARY OF THE INVENTION

The present invention provides an apparatus and method for controlling the guiding force of a diverter towed behind a seismic vessel. The apparatus comprises a body engaged with the cable and shaped to move the cable in a selected position when the vessel moves the cable relative to the water, wherein said body is extendible to increase the surface area of said body in contact with the water.

In different embodiments of the invention, the body can comprise two or more body sections moveable to increase the overall body surface area. One body section can be stored within or adjacent to the other. In another embodiment, the body can comprise an inflatable element controlled with a pump. A controller selectively increases or decreases the body surface area in contact with the water, thereby controlling the diverting orientation and displacement force.

The method for steering cable movement through the water comprises the steps of attaching a diverter body to the cable, positioning the diverter body in the water, towing the cable and attached diverter body through the water so that the diverter body steers movement of the cable in the water, and controlling the size of the diverter body surface area in contact with the water to modify the force exerted by the diverter body.

DESCRIPTION OF THE PREFERRED EMBODIMENTS

Figure 1:
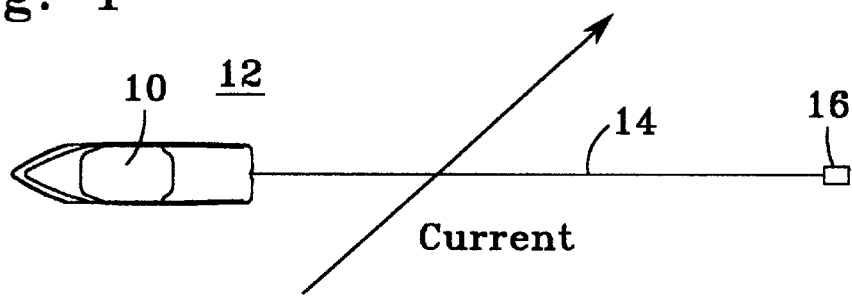
FIG. 1 illustrates a tow vessel, streamer and diverter in water.

The invention provides a unique apparatus and method for diverting movement of a marine streamer or other cable through water. FIG. 1 illustrates tow vessel 10 deployed in water 12. Cable 14 extends behind vessel 10, and expandable diverter 16 is attached to cable 14. As used herein, the term "cable" means seismic streamers, wires, conductors, and other structures for supporting floats, acoustic energy sources, hydrophones, positioning equipment, and other seismic assets. Diverter 16 comprises an expandible diverter as described more fully below. As illustrated in FIG. 1, a cross-current caused by ocean currents, wind, or tidal action can act against such components. Although vessel 10 can head into the cross-current to maintain the selected survey course, cable 14 will be moved from the in-line orientation unless one or more diverters 16 are positioned to pull cable 14 toward the survey line.

Figure 2:
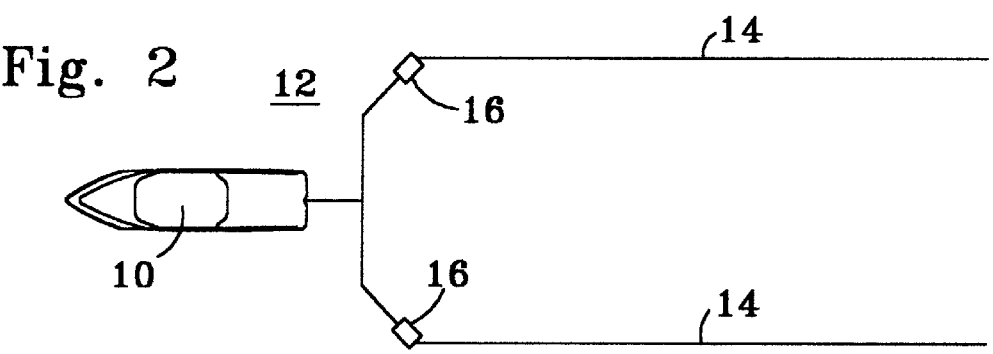
FIG. 2 illustrates two diverters engaged with two streamers behind a tow vessel.

FIG. 2 illustrates the operation of two diverters 16 for urging cables 14 outwardly from the in-line direction of vessel 10 in a multiple streamer array. As illustrated, the pulling force exerted by diverters 16 acts in opposing directions depending on the orientation of each diverter 16 relative to vessel 10. In this manner, the cross-line spacing of cables 14 can be maintained.

Figure 3:
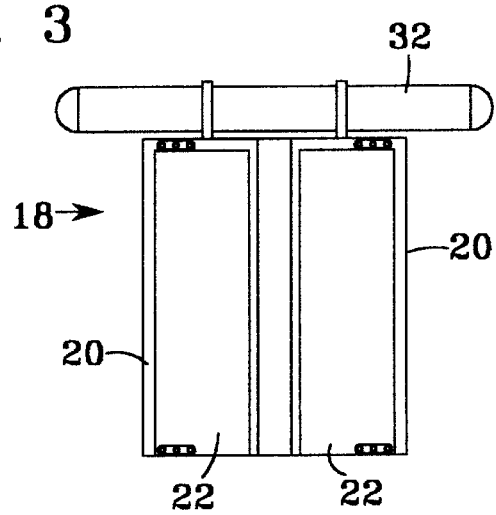
FIG. 3 illustrates an elevation view of a diverter body having first and second body sections in a retracted position.
Figure 4:
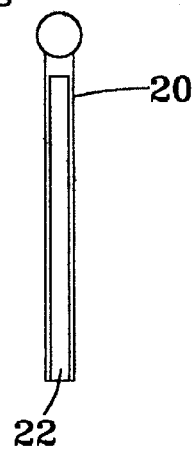
FIG. 4 illustrates an end view for the first and second diverter body sections.
Figure 5:
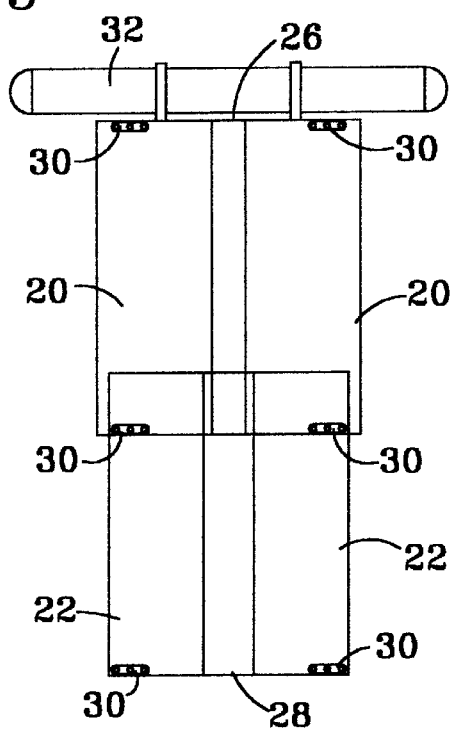
FIG. 5 illustrates the second body sections extended from the first body sections.
Figure 6:
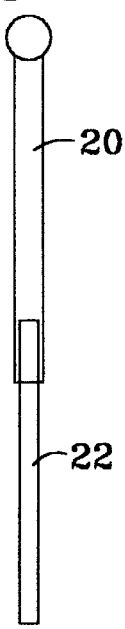
FIG. 6 illustrates an end view of the extended second body sections.

FIG. 3 illustrates one embodiment of expandable diverter 16 wherein diverter body 18 is generally comprised of first sections 20 and second sections 22. Three or more body sections can cooperate to accomplish the function of increasing or decreasing the diverter body 18 surface are in contact with water 12. FIG. 4 illustrates the end view for this embodiment in the retracted position. Second sections 22 are initially retracted within first section 20 as illustrated in FIG. 3, and are extendible as shown in FIGS. 5 and 6 to increase the surface area of diverter body 18 in contact with water 12. The shape, orientation, and size of first sections 20 and second sections 22 can be selected to increase or to decrease the amount and direction of displacement forces, and the drag within water 12. If body 18 is positioned in a vertical alignment as illustrated, the weight of each second section 22 maintains each second section 22 in the extended position as illustrated. When body 18 is retrieved from water 12 for storage or transport, second sections 22 can be withdrawn into first sections 20 and a clasp or tie-down (not shown) can retain each second section 22 in the retracted position.

Diverter body 18 can include upper frame 26 and lower frame 28 having brackets 30 for connection with first section 20 and second section 22. Float 32 can be attached to diverter body 18 with clamps 34 to maintain the elevation of diverter body 18 within water 12. In various embodiments of the invention, float 32 can have controls for changing the elevation of float 32 within water 12. In other embodiments of the invention, float 32 can have a mechanism (not shown) attached to body 18 for raising and lowering body 18 within water 12.

Figure 7:
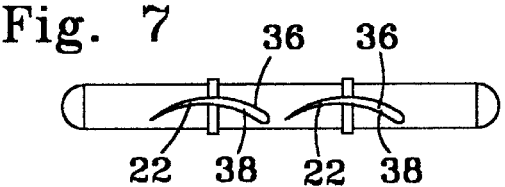
FIG. 7 shows the shape of second body sections as a curved wing.

As shown in FIG. 7, second sections 22 can be shaped in a wing configuration having convex surfaces 36 and concave surfaces 38. Shaped surfaces provide hydrodynamic lift and increased spreading force in water 12. The angle, shape, curvature, orientation, and size of first sections 20 and second sections 22 can be adjusted to the tow velocity, cable drag, and other factors to accomplish desired results.

Figure 8:
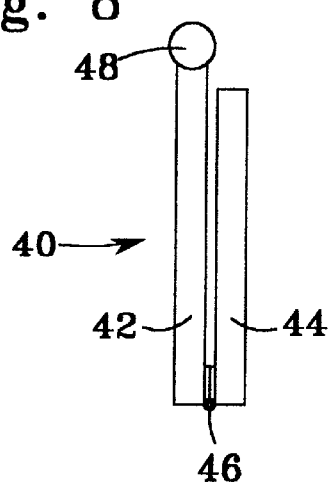
FIG. 8 shows an embodiment where the second body section is attached with a hinge to the first body section.
Figure 9:
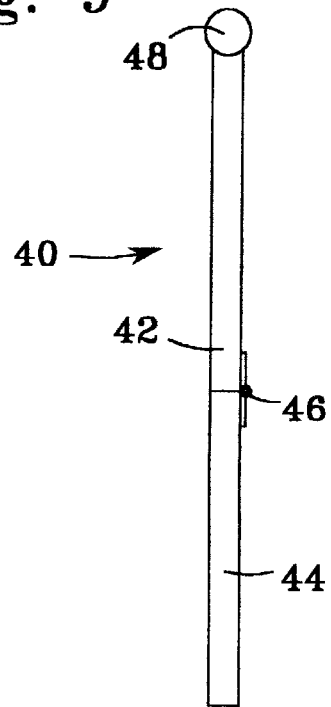
FIG. 9 illustrates the extended view of the hinged second body section.

FIG. 8 illustrates another embodiment of the invention wherein diverter body 40 is formed with first section 42 connected to second section 44 with hinges 46. Body 40 is stored and transported in the folded position shown, and can be released to rotate about hinges 46 to reach a fully extended position shown in FIG. 9. The weight of second section 44, and the hydrodynamic drag exerted against body 40, can maintain second section 44 in the extended position shown. Alternatively, clasps or locks (not shown) can secure second section 44 relative to first section 42. In another embodiment, a harness can be attached to first section 42 and to second section 44 to retain the respective orientation of such components. Although two sections are illustrated, three or more diverter body sections can cooperate to perform the function of expanding the surface area in contact with water 12. Controller 48 can control the operation of second section 44 relative to first section 42.

Figure 10:
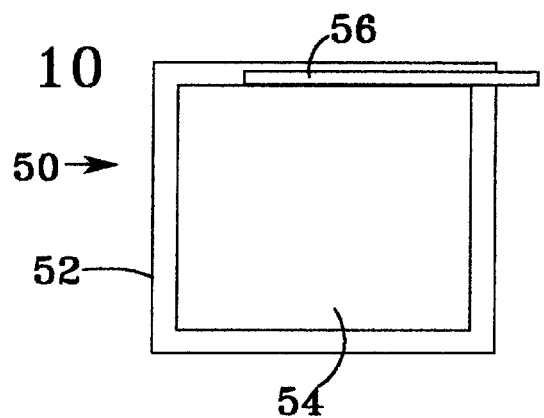
FIGS. 10 and 11 illustrate a second body section adjacent to a first body section, and extendible in a direction substantially parallel to the first body section.
Figure 11:
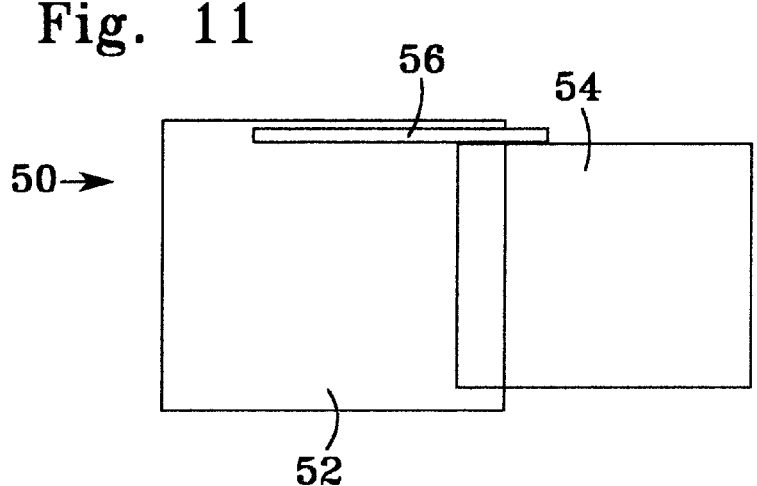

FIG. 10 illustrates another embodiment of the invention wherein diverter body 50 comprises first section 52 and second section 54 initially retained in a position adjacent to first section 52. Guide 56 facilitates movement of second section 54 in a direction substantially parallel to first section 52 as shown in FIG. 11. Such extension can be accomplished on board the deck of vessel 10 or can be controlled when diverter 50 is in water 12.

Figure 12:
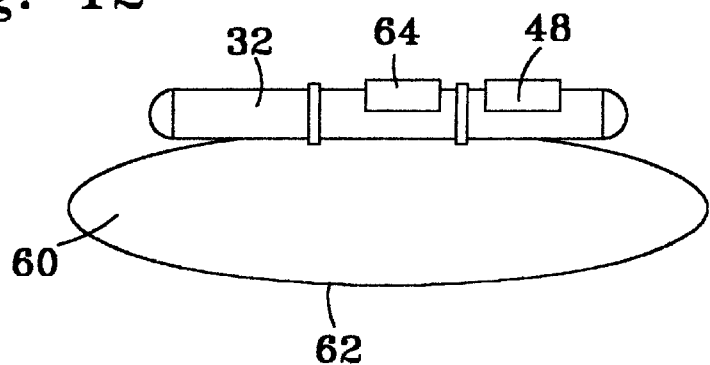
FIG. 12 illustrates a flexible diverter body expandable with a pump.

FIG. 12 illustrates an expandible diverter body 60 having flexible housing 62 which can be enlarged or expanded to increase the surface area of diverter body 60. In one embodiment, flexible housing 62 can be expanded with pump 64 which provides compressed air or compressed liquid to expand flexible housing 62. To reduce the surface area of flexible housing 62 in contact with water 12, the compressed air or liquid can be released from within flexible housing 62 to reduce the internal pressure, and corresponding expansion of flexible housing 62. The shape, configuration and orientation of flexible housing 62 can be selected to accomplish different objectives. Controller 48 can control the increase or decrease in size, configuration or surface area in contact with water 12.

Although the embodiments described herein refer to diverters extendible in a substantially vertical orientation, diverter body 18 can be oriented horizontally or in other orientations to accomplish different tow results. By orienting diverter body 18 in a substantially horizontal orientation, the elevation of diverter body 18 can be controlled.

The invention permits the volume of the diverter to be minimized during storage and transport. This feature of the invention is particularly useful within the limited cargo space available on seismic tow vessels. As diverter is deployed into water 12, diverter can be expanded to a selected size or configuration to obtain the selected force desired for moving cable. This feature of the invention is significant because the diverters can be adjusted in the water without interrupting marine seismic operations, and without withdrawal of the diverters to the seismic vessel deck for adjustment.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus towable behind a seismic vessel for moving a cable within water, comprising:

a body engaged with the cable and shaped to provide a force moving the cable in a selected position relative to the vessel as the vessel tows the cable through the water, wherein said body is extendible to increase the surface area of said body in contact with the water and to increase the force exerted by said body to move the cable.

2. An apparatus as recited in claim 1, wherein said body comprises a first body section and a second body section moveable relative to said first body section.

3. An apparatus as recited in claim 1, wherein said second body is initially retained within said first body, and said second body is extendible relative to said first body to increase the surface area of said second body in contact with the water.

4. An apparatus as recited in claim 2, wherein said second body is substantially contained within said first body before said second body is extended relative to said first body.

5. An apparatus as recited in claim 2, wherein said second body section is initially located adjacent to said first body section and is moveable in a direction substantially parallel to an axis through said first body section to increase the amount of surface area in contact with the water.

6. An apparatus as recited in claim 2, further comprising a hinge for permitting said second body to move relative to said first body.

7. An apparatus as recited in claim 1, further comprising a controller for selectively changing the surface area of said body in contact with the water.

8. An apparatus as recited in claim 1, wherein said body is selectively inflatable to increase the surface area of said body in contact with the water, and further comprising a pump for inflating said body surface area.

9. An apparatus as recited in claim 1, wherein said body is extendible in a substantially vertical direction in the water to increase the diverting force exerted by said body to move the cable laterally relative to vessel movement.

10. An apparatus towable behind a seismic vessel for moving a cable within water, comprising:
   a first body section engaged with the cable and shaped to provide a force moving the cable in a selected position relative to the vessel as the vessel tows the cable through the water;
   a second body section moveable relative to said first body section to increase the surface area of said second body section in contact with the water and to increase the force exerted by said first body section to move the cable; and
   a controller engaged with said second body section for selectively moving said second body section relative to said first body section.

11. An apparatus as recited in claim 10, further comprising a frame attached to said first body section for engagement with the cable.

12. An apparatus as recited in claim 10, wherein said second body section is initially stored within said first body section and is extendible outwardly to increase the surface area of said second body section in contact with the water.

13. An apparatus as recited in claim 10, wherein said second body section is initially stored adjacent to said first body section and is moveable to increase the combined surface area of said first body section and said second body section in contact with the water.

14. An apparatus as recited in claim 13, further comprising a hinge for permitting articulated movement between said first and second body sections.

15. An apparatus as recited in claim 13, further comprising a guide for controlling movement of said second body section relative to said first body section.

16. A method for steering cable movement through water, comprising the steps of:
   attaching a diverter body to the cable;
   positioning said diverter body in the water;
   towing the cable and attached diverter body through the water so that said diverter body steers movement of the cable in the water; and
   controlling the size of said diverter body surface area in contact with the water to control movement of the cable by modifying the force exerted by said diverter body as the cable and diverter body are towed through the water.

17. A method as recited in claim 16, further comprising the step of expanding the size of said diverter body to increase the diverter body surface area in contact with the water.

18. A method as recited in claim 16, further comprising the step of operating a controller to control said diverter body size.

19. A method as recited in claim 16, wherein said diverter body comprises a first body section and a second body section retractable within said first body section, further comprising the step of controlling said diverter body size by moving said first body section outside of said first body section.

20. A method as recited in claim 16, wherein said diverter body comprises a first body section and a second body section adjacent to said first body section, further comprising the step of moving said second body section relative to said first body section to increase the surface area of said second body section in contact with the water.

* * * * *